(12) United States Patent
Boling et al.

(10) Patent No.: US 10,390,374 B2
(45) Date of Patent: Aug. 20, 2019

(54) CONFIGURABLE COMMUNICATION INFRASTRUCTURE FOR EVENT SPACES

(71) Applicant: Disney Enterprises, Inc., Burbank, CA (US)

(72) Inventors: Shawn Boling, Davenport, FL (US); Ronald Dearing, Windermere, FL (US); Daniel Estatico, Windermere, FL (US); Gregory Hale, Orlando, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 66 days.

(21) Appl. No.: 15/281,925

(22) Filed: Sep. 30, 2016

(65) Prior Publication Data

US 2018/0098363 A1 Apr. 5, 2018

(51) Int. Cl.
| | |
|---|---|
| *H04L 29/06* | (2006.01) |
| *H04W 76/10* | (2018.01) |
| *H04W 48/10* | (2009.01) |
| *H04W 84/18* | (2009.01) |
| *H04W 4/029* | (2018.01) |
| *H04W 12/08* | (2009.01) |
| *H04W 12/00* | (2009.01) |
| *H04W 84/12* | (2009.01) |
| *H04W 12/02* | (2009.01) |

(52) U.S. Cl.
CPC ........... *H04W 76/10* (2018.02); *H04W 4/029* (2018.02); *H04W 12/003* (2019.01); *H04W 12/08* (2013.01); *H04W 48/10* (2013.01); *H04W 84/18* (2013.01); *H04W 12/00514* (2019.01); *H04W 12/02* (2013.01); *H04W 84/12* (2013.01)

(58) Field of Classification Search
CPC .. H04L 63/0492; H04W 76/02; H04W 76/10; H04W 48/10; H04W 84/12; H04W 84/18; H04W 12/02; H04W 12/08; H04W 4/02
See application file for complete search history.

(56) References Cited

U.S. PATENT DOCUMENTS

| | | | |
|---|---|---|---|
| 2011/0057798 A1* | 3/2011 | Lorenzo ................. | G06Q 30/02 340/573.1 |
| 2012/0233000 A1* | 9/2012 | Fisher .................... | G06O 30/02 705/14.71 |
| 2013/0210461 A1* | 8/2013 | Moldaysky ........ | G06Q 30/0261 455/456.3 |
| 2013/0282421 A1* | 10/2013 | Graff .................. | G06Q 10/1093 705/7.18 |

(Continued)

*Primary Examiner* — Joseph P Hirl
*Assistant Examiner* — Chi D Nguy
(74) *Attorney, Agent, or Firm* — Marsh Fischmann & Breyfogle LLP; Kent A. Lembke

(57) ABSTRACT

One embodiment provides a system for event space communication infrastructure, including: a plurality of mobile infrastructure devices; each of the plurality of mobile infrastructure devices being associated with one or more predetermined users; each of the plurality of mobile infrastructure devices comprising a wireless communication device that: broadcasts a unique identifier associated with a predetermined user; detects a response from at least one client mobile device; switches into a communication mode after detecting the response; and establishes data exchange with the at least one client mobile device. Other aspects are described and claimed.

20 Claims, 5 Drawing Sheets

(56) References Cited

U.S. PATENT DOCUMENTS

2015/0324400 A1* 11/2015 Sheck ................... H04L 67/22
 707/795
2016/0381543 A1* 12/2016 Zhang .................. H04W 76/14
 455/411
2017/0061490 A1* 3/2017 Ghahremani ...... G06Q 30/0261

* cited by examiner

CONFIGURABLE COMMUNICATION INFRASTRUCTURE FOR EVENT SPACES

BACKGROUND

Convention floor spaces, trade show venues and similar event spaces pose challenges with respect to providing a communication infrastructure therewith. This is at least in part due to the fact that event spaces change dynamically, e.g., vendor or booth locations change over the course of a convention or between events.

Typically, broad-coverage Wi-Fi® access or cellular networks are used for providing indoor or outdoor wireless communication capabilities in such scenarios, but these networks tend to cover the entire event space (or large portions thereof) indiscriminately. Wi-Fi® access points or routers are installed in fixed locations in an un-configured event space, which results in uneven coverage patterns. Moreover, the coverage pattern will often change unpredictably once the event space is configured for a particular event as temporary structures, signage, and even people cause signal attenuation and reflection. Wi-Fi® is a registered trademark of Wi-Fi Alliance in the United States and other countries.

Conventionally, attendees at events have relied on wide area coverage wireless networks, e.g., Wi-Fi® or cellular networks, and turned to more traditional solutions for targeted exchange of information. For example, conference attendees have Wi-Fi® access but still rely on leaving a business card with a booth or vendor of interest. In some cases, scanning a magnetic strip card is used to pass simple identifying information. In order to obtain other information, e.g., locations of vendors of interest, product information on items of interest, etc., paper brochures or static maps are still provided.

BRIEF SUMMARY

In summary, an embodiment provides a system for event space communication infrastructure, comprising: a plurality of mobile infrastructure devices; each of the plurality of mobile infrastructure devices being associated with one or more predetermined users; each of the plurality of mobile infrastructure devices comprising a wireless communication device that: broadcasts a unique identifier associated with a predetermined user; detects a response from at least one client mobile device; switches into a communication mode after detecting the response; and establishes data exchange with the at least one client mobile device.

Another embodiment provides a method for event space communication, comprising: broadcasting, with a mobile infrastructure device, a unique identifier associated with a predetermined user; detecting, at the mobile infrastructure device, a response from at least one client mobile device; switching the mobile infrastructure device into a communication mode after detecting the response; and establishing, between the mobile infrastructure device and the at least one client mobile device, data exchange.

A further embodiment provides a method for event space communication, comprising: providing, to a client mobile device, an application comprising predetermined user information; receiving, from the client mobile device, an indication of interest in at least one predetermined user included in the predetermined user information; identifying, using a processor, a predetermined user based on the indication of interest; providing, to the client mobile device, a unique identifier of the predetermined user; and thereafter communicating, to a mobile infrastructure device assigned to the predetermined user, a unique identifier of the client mobile device.

A still further embodiment provides a mobile infrastructure device for event space communication, comprising: a communication device that broadcasts a unique identifier associated with a predetermined user; a processor that detects a response from at least one client mobile device and switches into a communication mode after detecting the response; and a communication device that, after detecting the response from the at least one client device, establishes data exchange with the at least one client mobile device.

For a better understanding of the embodiments, together with other and further features and advantages thereof, reference is made to the following description, taken in conjunction with the accompanying drawings. The scope of the embodiments will be pointed out in the appended claims.

DETAILED DESCRIPTION

Figure 1:
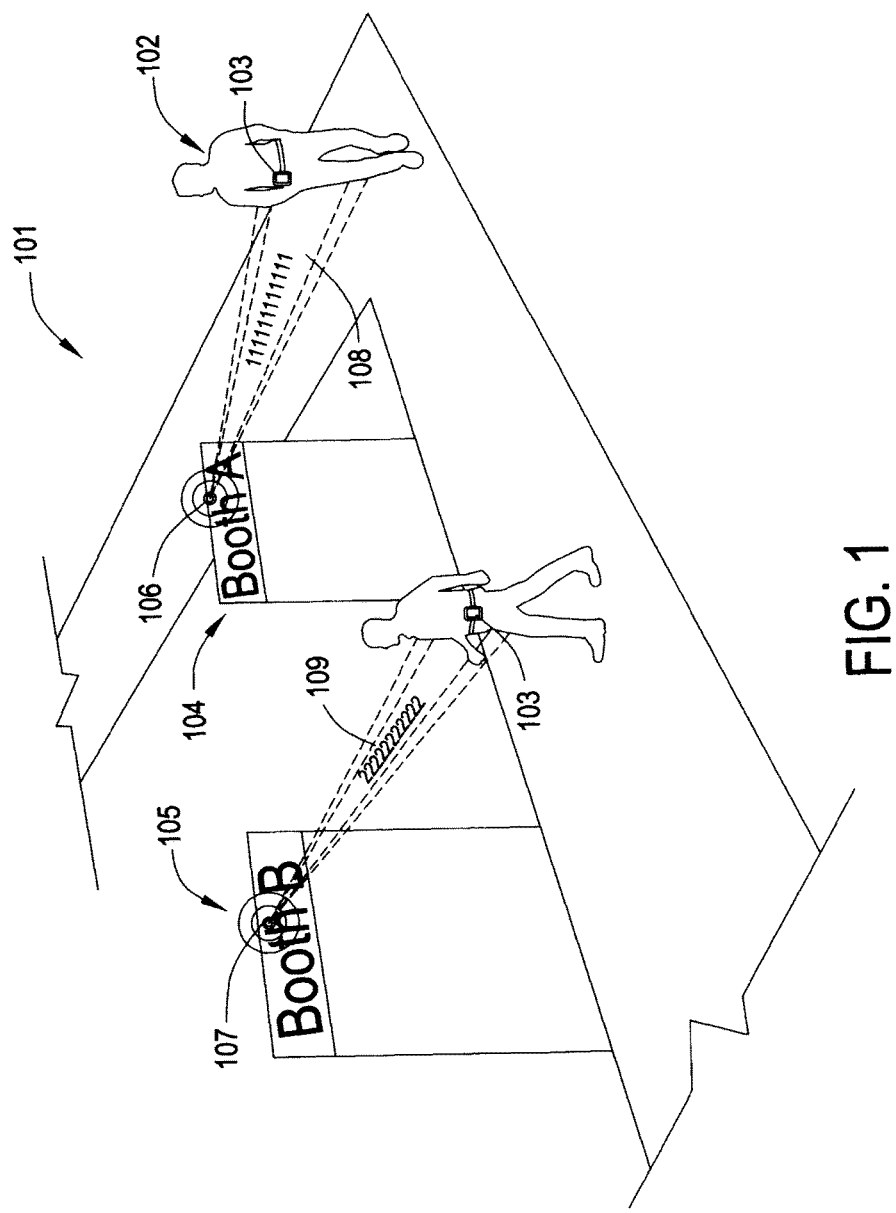
FIG. 1 illustrates an example of broadcasting identification data from infrastructure devices according to an embodiment.

As used herein, a mobile infrastructure device is any mobile electronic that may be temporarily deployed in an event space and exchange data with other electronic devices. Examples of mobile infrastructure devices include an infrared (IR) communication device, a Bluetooth® communication device, a Bluetooth® Low Energy (LE) communication device, a cellular communication device, a Wi-Fi® communication device, a radio frequency identification (RFID) communication device, a near field communication (NFC) device, and combinations of the foregoing. Bluetooth® is a registered trademark of Bluetooth SIG, Inc. in the United States and other countries.

As used herein, a mobile infrastructure device may be deployed and communicate with other mobile infrastructure devices to form or join a mesh network.

As used herein, a booth device is an example of a mobile infrastructure device that is assigned to an event vendor for use indoors or outdoors.

As used herein, a client mobile device is any electronic device that communicates with a mobile infrastructure device. An example of a client mobile device is a mobile phone.

As used herein, an event space is a floor space, a trade show venue, a convention space, a room within a building, an outdoor space, a combination of indoor and outdoor spaces, or any space that employs a temporary or changing configuration for an event.

While various wide area network services provide generic wireless communication capabilities (e.g., voice, texting, and Internet access) to an event space, these offer broad interconnectivity services, i.e., coverage is provided for an entire room or floor of a conference center, a large area of outdoor space, a room within a building, etc. There is no granular linking of attendees (e.g., vendors and clients) because conventional infrastructure devices (e.g., Wi-Fi® hotspots, femto-cells, etc.) are not configured to distinguish between attendees that connect thereto. Additionally, conventional network approaches are static, where the infrastructure devices are static, i.e., remains in the same place and configuration throughout the event.

This forces clients and vendors to rely on conventional (e.g., paper-based) communication techniques. For example, in a typical trade show or conference, a vendor in a booth might wish to speak or interact with a subset of potential clients. Likewise, clients are often interested in only a subset of vendors or booths. Conventionally, such attendees must rely on exchanging of business cards in order to communicate simple contact information. Additionally, clients must rely on paper or static electronic maps to locate vendor booths of interest. Furthermore, vendors are not aware of the itinerary of the clients, much less their real-time location, and so must rely on conventional communication techniques (emails, phone calls, etc.) to establish meeting times. Still further, vendors often must wait until after a convention or trade show has concluded to have access to metrics of interest, e.g., number of conference attendees, number of clients that visited the vendor's booth, etc.

Accordingly, embodiments provide systems, methods and products for implementing a communication infrastructure that may be changed as necessary, e.g., on the fly, such that a dynamic link between different attendees is achieved.

An embodiment facilitates granular resolution of client and vendor locations in real time using peer-to-peer wireless communications between mobile devices. Methods used to connect mobile devices can include infrared (IR) communication, Bluetooth® communication, Bluetooth® Low Energy (LE) communication, cellular communication, Wi-Fi® communication, radio frequency identification (RFID) communication, near field communication (NFC), and other communication techniques. In an embodiment, the peer-to-peer wireless communication is augmented by a connection to a back end system and a broader network, e.g., the Internet.

The illustrated example embodiments will be best understood by reference to the figures.

Referring to FIG. 1, an example embodiment is illustrated as implemented in an event space 101 such as a convention or trade show venue. Prior to the event, a client 102 registers and downloads an application to configure the event experience. The application may be downloaded to a client mobile device 103 of the client 102, such as a mobile phone that includes a wireless communication subsystem. As part of the configuration process, the client 102 will indicate preferences in terms of what other attendees (e.g., vendors) that the client 102 is interested in. These other attendees (e.g., vendors) are added to a list by the client 102 within the application.

Thereafter, as the client 102 walks about the convention floor within the event space 101, signals 108, 109 are transmitted to the client mobile device 103 from mobile infrastructure devices such as booth devices 106, 107, located in vendor booths 104, 105, respectively. Based on the configuration of the application running on the client mobile device 103, the client 102 may be notified by the client mobile device 103 that the client 102 is in proximity to a vendor's booth that is of interest.

In the example illustrated in FIG. 1, if the client 102 had previously expressed an interest in a vendor associated with vendor booth B 105, but had not expressed an interest in vendor booth A 104, the application running on the client mobile device 103 is configured to notify the client 102 when the signal 109 is received by client mobile device 103, but not when the signal 108 is received by client mobile device 103.

The signals 108, 109 may be wireless beacon signals transmitted using a standardized protocol. For example, signals 108, 109 may be Bluetooth LE® signals that are transmitted by Bluetooth LE® booth devices 106, 107. In an embodiment, the signals 108, 109 contain a unique identifier or code such that client mobile device 103 may receive signals 108, 109 and identify vendors using signals 108, 109.

In the non-limiting example of a Bluetooth LE® device, booth devices 106, 107 comprise a 2.4 GHz system on chip design that operates a Bluetooth LE® protocol and includes peripherals to interface with external devices. In one example, the system provides a radio frequency (RF) transceiver (e.g., a Bluetooth® 4.0 radio), and RAM memory for operation. The booth devices 106, 107 include a microprocessor or microcontroller core and a programmable memory such as FLASH memory. In one example, the booth devices 106, 107 include infrared (IR) generation circuitry and provide digital received strength indicator (RSSI) data. The booth devices 106, 107 are powered directly by a battery, e.g., 3V battery, and are characterized by very low power usage. Bluetooth LE® devices are available from a variety of vendors including Silicon Laboratories and Texas Instruments.

The booth devices 106, 107 are distributed to vendors at registration or check-in time, where each booth device 106, 107 is associated with a unique vendor, vendor booth, etc. The signals 108, 109 are unique to the booth devices 106, 107, respectively, i.e., permitting client mobile device 103 to distinguish between vendor booths 104, 105 using signals 108, 109.

In an embodiment, the application running on client mobile device 103 permits the client 102 to distinguish between large numbers of vendors in a semi-automated fashion. Therefore, after the client 102 has expressed interests to the application running on client mobile device 103, the client 102 is automatically notified only of those vendors he or she has an interest in.

The selection of or expression of interest in various vendors (or other entities of interest) is facilitated by the application running on client mobile device 103 in a variety of ways. For example, the application running on client mobile device 103 permits the client 102 to select topic categories or to select vendors individually, with the topic categories automatically adding various vendors to the client's 102 interest list.

In an embodiment, if a client 102 has not configured the application, or if there are vendor booths (beacon or signaling devices) that have not been added to the interest list, the client 102 manually interacts with the client mobile device 103 to express an interest in the vendor. For example, a client 102 interfaces with the client mobile device 103 to request information proactively from a booth device 106 or 107, or a client 102 reacts to a notification from the client mobile device 103 by expressing interest, e.g., manually interfacing with client mobile device 103 to request more information from a booth device 106, 107.

If the client 102 has expressed an interest in a particular vendor, and thereafter is proximate to (within range of) that vendor's booth device 106, 107, a communication protocol is established for exchange of information between the client mobile device 103 and the vendor's booth device, e.g., booth device 107.

Figure 2:
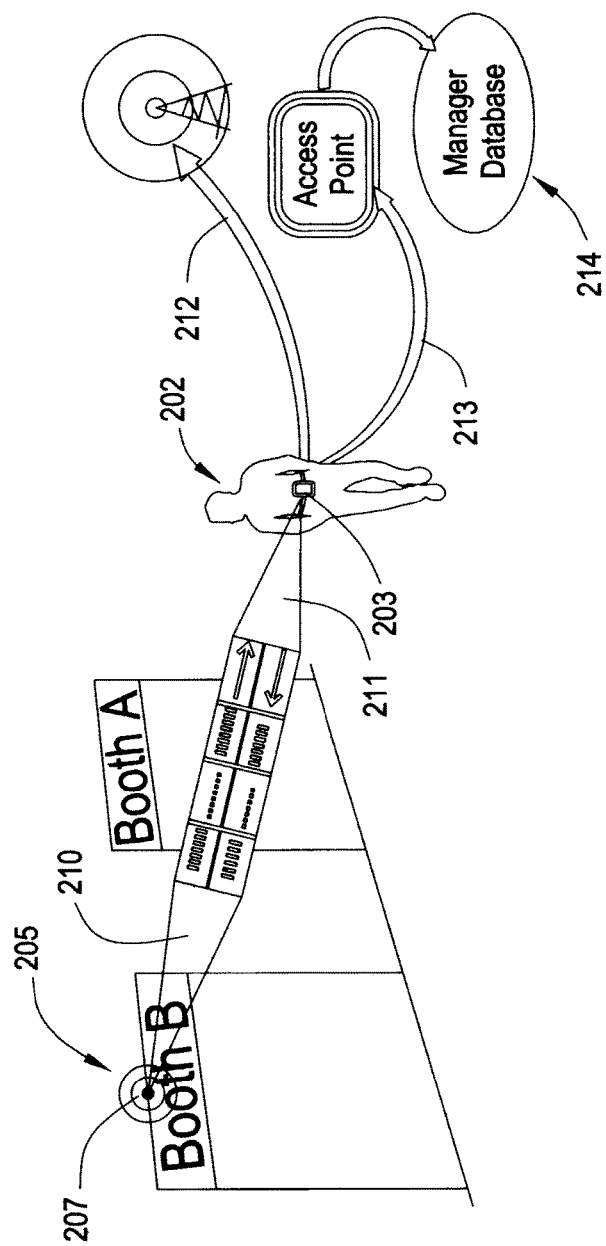
FIG. 2 illustrates an example of data exchange between an infrastructure device and a client device according to an embodiment.

By way of example, illustrated in FIG. 2 is an example wireless communication protocol according to an embodiment. As shown, a client 202 configures the application running on client mobile device 203 to consider vendor booth B indicated at 205 of interest. The vendor that operates vendor booth B 205 likewise registers and obtains a device, here booth device 207. The booth device 207 broadcasts a wireless beacon signal, an infrared signal, etc., i.e., signal 210, including a unique code that has been associated with the vendor operating vendor booth B 205.

As client 202 is within signal range of signal 210, client mobile device 203 receives signal 210 and unique code contained therein. For example, booth device 207 is a Bluetooth® LE beacon device that transmits a wireless beacon signal 210 that is received by a Bluetooth® radio resident on client mobile device 203. Client mobile device 203 in turn determines the presence of a unique code within the signal 210. This permits client mobile device 203 to identify the vendor associated with vendor booth B, shown at 205. This identification is conducted locally on client mobile device 203, e.g., by the application running on client mobile device 203 and configured by client 202. This identification may also be conducted remotely, e.g., by communication between client mobile device 203 and another device, e.g., manager database 214, via wireless network communication link 213, or via telecommunications network communication link 212. A combination of local and remote identification may be utilized.

If the unique code contained in signal 210 is that of a vendor for which the client 202 has expressed an interest, client mobile device 203 notifies client 202 automatically that client 202 is proximate to vendor booth B 205. Additionally, client mobile device 203 takes part in an automated two-way communication protocol with booth device 207.

For example, client mobile device 203 transmits a signal 211 in order to acknowledge signal 210 and request that the two way communication be established. This permits the client mobile device 203 to identify itself to the booth device 207. Furthermore, the client mobile device 203 requests information from the booth device 207, e.g., electronic briefcase documents, multimedia presentations, etc.

The two way communication is facilitated by a backend system comprising manager database 214 or other devices. For example, in order to obtain certain data, client mobile device 203 is provided with a link or resource locator, communicated from booth device 207, which is used to obtain prepared materials of the vendor, e.g., multi-media presentations such as videos, audio files, etc. Alternatively, booth device 207 communicates information directly to client mobile device 203. In an embodiment, different information may be distributed to different client devices, e.g., multi-media presentations such as videos, audio files, etc., may be provided to client devices in different languages according to preferences associated with the client devices, e.g., as determined during client device application configuration.

In FIG. 2, the client 202 has expressed interest in the vendor at vendor booth B 205. In this case, the client 202 does not even need to stop at vendor booth B 205 to receive information from the vendor. All relevant information is provided to the client mobile device 203 as the client 202 passes by the vendor's booth 205, whether in real time or at a later time. This information can be delivered directly to the client mobile device 203 or delivered to a separate location (e.g., email address) identified by the client 202 during the application configuration process. No physical interaction between the client 202 and the vendor in vendor booth B 205 is necessary for the client mobile device 203 to gather information of interest.

If the client 202 has not expressed an interest in the vendor associated with vendor booth B 205, and identified by booth device 207, and has no interest in the information, products, goods, or services provided, no information is delivered to the client mobile device 203 as he or she passes by vendor booth B 205.

In an embodiment, the application running on client mobile device 203 validates what information has already been exchanged with or obtained from booth device 207 on receipt of signal 210. If the client mobile device 203 has previously interacted with the vendor (e.g., has already walked past vendor booth B 205), duplicate information exchanges is prevented.

Referring back to FIG. 1, as a client 102 moves throughout the event, each vendor's booth 104, 105 emits a signal 108, 109 (wireless beacon signal, infrared signal, etc.) using booth devices 106, 107 to indicate presence. During this part of the signaling process, booth devices 106, 107 act as clients that continuously or intermittently emit a signal 108, 109 that is unique to that vendor's booth (e.g., broadcasting an "advertisement" such as "I am here" coupled with a unique identifier). If a client mobile device 203 passes by and there's no interest by the vendor or the client 202, the booth devices 106, 107 remain as clients and continue to provide signals 108, 109.

Referring again to FIG. 2, if a client 202 has an interest, e.g., has white listed the vendor associated with booth device 207, or if the vendor associated with booth device 207 has identified the client 202 as a client or potential client of interest, then additional communication steps begin. During these additional steps, the booth device 207 changes roles several times, between client and server roles.

Figure 3:
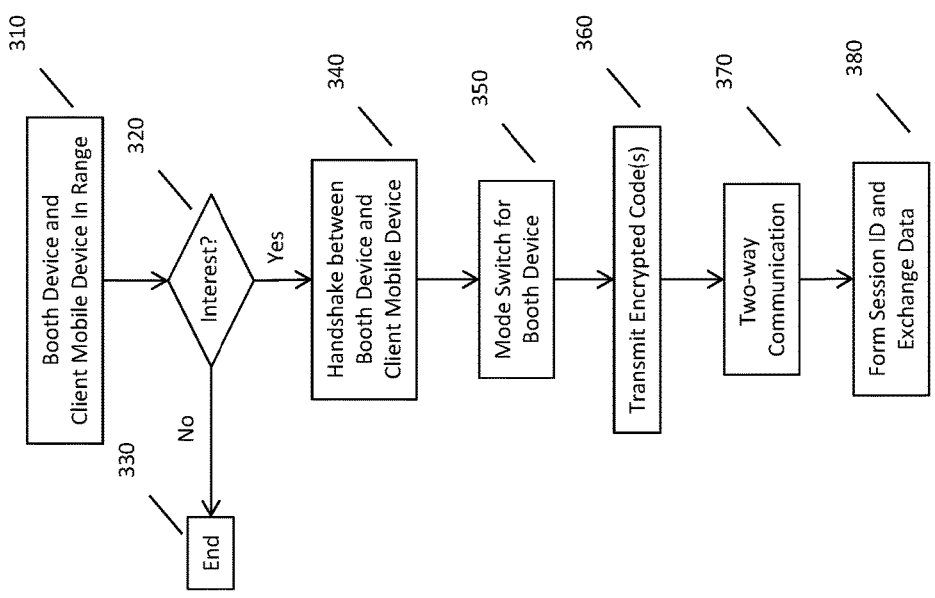
FIG. 3 illustrates an example method of communication between mobile devices according to an embodiment.

As illustrated in FIG. 3, the communication process between the booth device and the client mobile device is described. Initially, the process begins when the client mobile device and booth device are in range, as illustrated at 310. Thus, the client mobile device is proximate to the booth device in terms of being physically within wireless communication range, for example, within several meters of the booth device. If it is confirmed that there is communication interest between attendee and vendor, as illustrated at 320, further communication proceeds. However, if there is no communication interest, e.g., attendee has not expressed an interest in the vendor, then the process may end at 330.

Once it is confirmed that there is an interest at 320, a handshake process occurs at 340 between the vendor device and the client mobile device. During this handshake process at 340, the booth device changes modes from client to server, as illustrated at 350. Thus, the booth device switches modes from broadcasting to responding to specific requests from the client mobile device.

In an embodiment, the two way communications between the client mobile device and the booth device are secured using an encryption technique. For example, the client mobile device receives an encrypted code from the booth device that contains a unique identifier associated with this specific and unique vendor at 360. The booth device receives an encrypted reply code with a unique identifier associated with the specific and unique attendee as well at 360.

Having determined interest, performed a handshake, and secured a communication channel, data is then exchanged in a two way communication at 370. Now that communication is established at 370, a method to create a unique communication session identification (session ID) is provided, followed by data exchange, as illustrated at 380. One possible session ID contains the attendee's unique identifier plus the vendor unique identifier, a time/date stamp and an identifier for the information exchanged in both directions. The unique session ID carries information back to the manager database for action. Typical actions include but are not necessarily limited to sending information to the attendee or providing information to vendor. For example, demographic heuristics can be provided in real time to the vendor.

In an embodiment, data is exchanged through the client mobile device via an application that gives the attendee choices about which information is of interest and/or what information will be exchanged or sent to the attendee by the booth device. Attendee information will also be sent to the vendor, e.g., contact information for future follow-up, based on the attendee's unique identifying information being sent as part of the two way information exchange. During this process data is also sent to the manager database, e.g., for demographic heuristics, metrics, real time analytics, etc.

The exchange of data may be directed by the vendor, the attendee, or both. For example, the attendee may request certain types of data (presentation materials, brochures, etc.) if available, and the vendor may request certain data from the attendee, e.g., contact information, demographic information, etc. As another example, a client can schedule an appointment with the vendor, e.g., by transmitting scheduling data such as calendar data indicating availability to the vendor to set an appointment. Database manager 214 may thereafter send both parties a notification reminder prior to the scheduled appointment.

Figure 4:
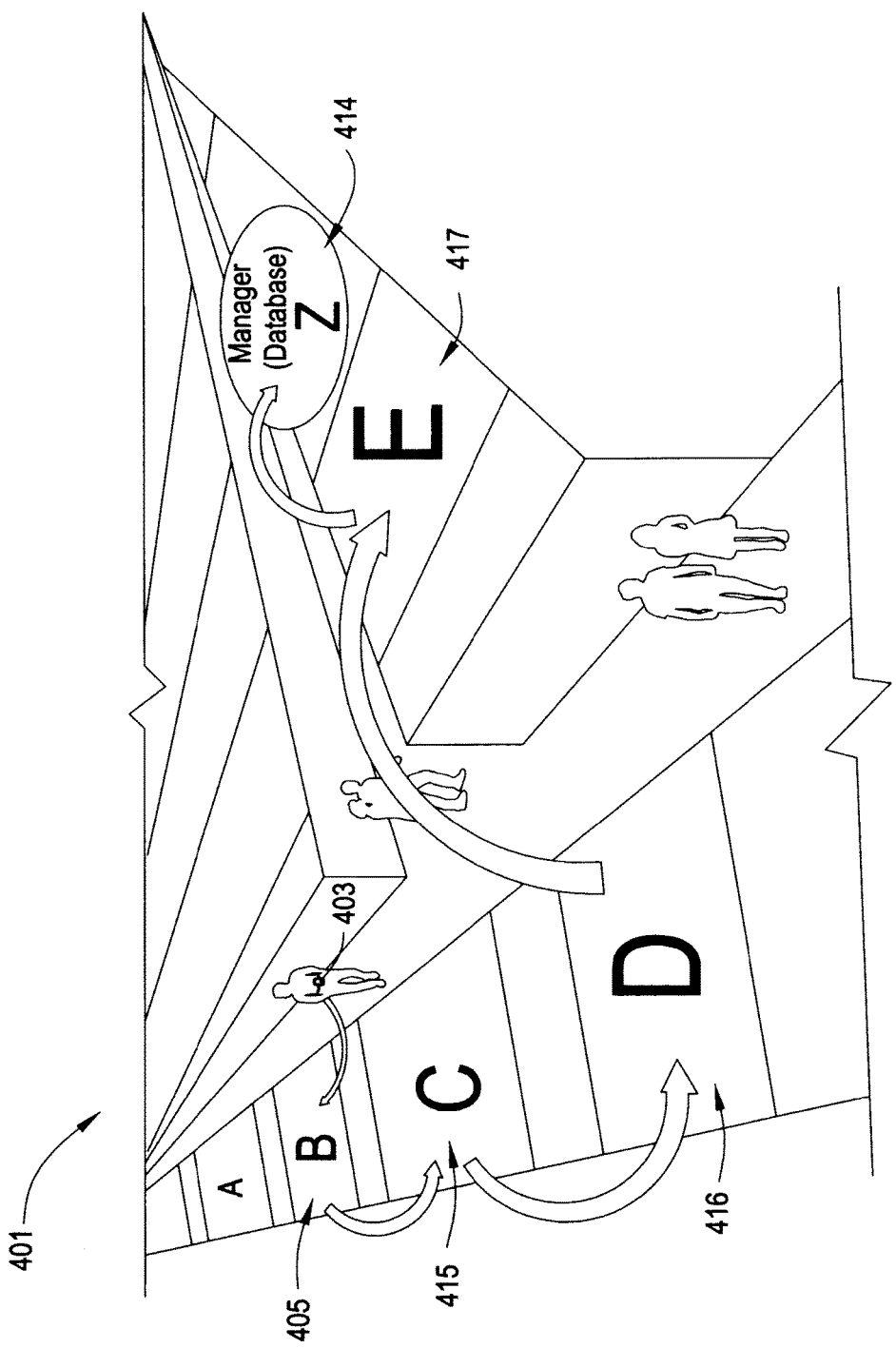
FIG. 4 illustrates an example of a deployed communication infrastructure for an indoor event space according to an embodiment.

Referring to FIG. 4, the network of booth devices is aware, i.e., a booth device is able to determine which other booth device(s) are in close proximity, even though the booth device(s) are mobile, because each is deployed with a unique ID. For example, the booth devices communicate with one another to form a configurable mesh network.

As shown in FIG. 4, for a given layout of an event space 401 having various vendor booth locations (here, booths A, B, C, D, and E), there are numerous paths for data exchanged between a booth device and a client mobile device 403 to return to the manager database 414, irrespective of the communication technology leveraged (e.g., Wi-Fi®, Bluetooth® LE, subscriber identity module (SIM), IR, combinations of these, etc.). The network of booth devices is provided with logic for identifying the most effective path to pass data between the manager database 414 and the client mobile device 403 using the mesh network.

Various routes for the data are chosen for example based on the type of communication technologies used by the booth devices, based on the current volume and throughput of data, based on the current configuration of the mesh network of booth devices within the event space, etc. As an example, if IR were used by the booth devices to communicate with the manager database at 414, the path may go from booth B at 405, to booth C at 415, to booth D at 416 and finally to booth Z at 414 (the manager database). If Bluetooth® LE beacon communication were used to communicate data from a client mobile device 403 to the database manager at 414, the path may be from client mobile device 403 to booth B at 405 to booth C at 415 to booth D at 416 to booth E at 417 and thereafter to booth Z at 414.

In an embodiment, each unique data packet sent to the manager database 414 includes a unique session ID containing the vendor ID, the attendee ID, a time/date stamp, and identifier for the type of data exchanged. Once exchange of information is complete, the booth device and the client mobile device 403 close the session. The booth device returns to a client mode ready to serve the next client mobile device. The client mobile device 403 returns to a mode passively listening for the next booth device of interest.

Figure 5:
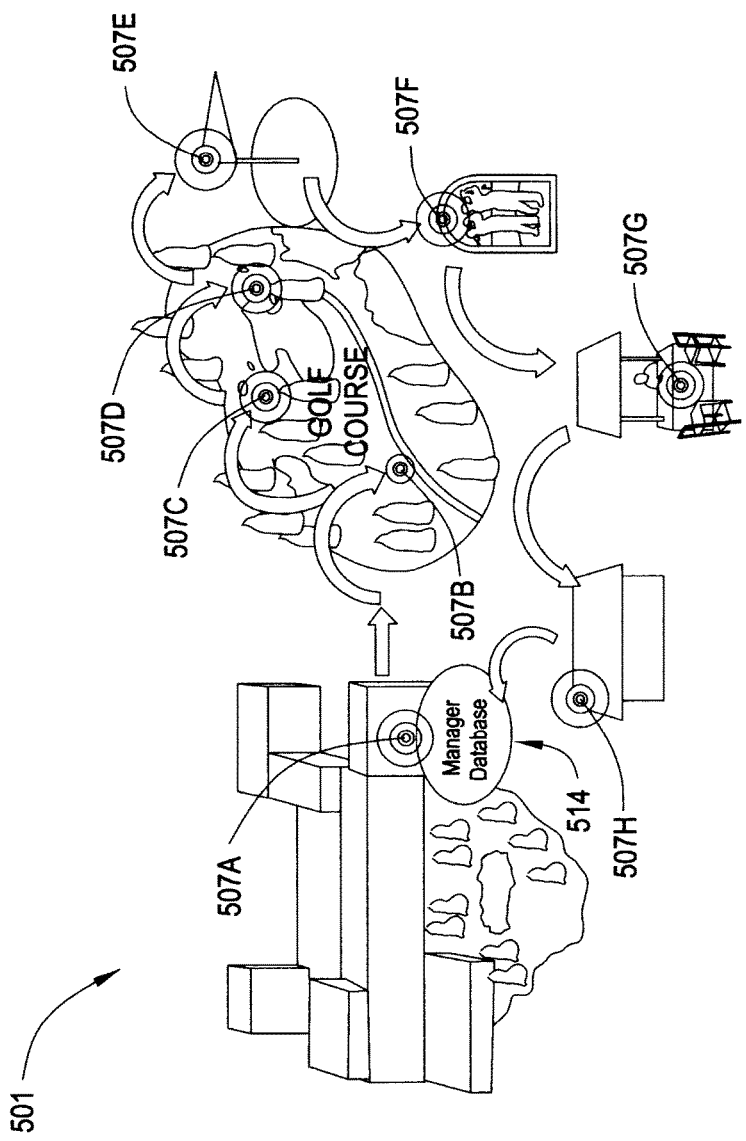
FIG. 5 illustrates an example of a deployed communication infrastructure for an indoor and outdoor event space according to an embodiment.

Unlike Wi-Fi® access point based network communication, or other fixed or static position methods, an embodiment provides a deployable network of mobile infrastructure devices that can be created indoors, outdoors, or transition from indoors to outdoors, as illustrated in FIG. 5. Due to the methodologies used, wired power is not necessary, thus eliminating long cable runs and complex set up.

For indoor and outdoor use, for example in the event space 501 of FIG. 5, booth devices may be used indoors as has been described herein. For example, an indoor booth device 507a is illustrated proximate to database manager 514.

Additionally, booth devices may be used outside as well. In the example of FIG. 5, devices 507b-507h, which may take the form of Bluetooth® LE beacon devices (although this is not required), are placed in target locations where each interacts with other proximate devices. The configuration of the network is essentially limitless because each booth device learns where it is in relation to all other booth devices in the event space 501 during a discovery and configuration phase, i.e., it forms a mesh network with at least one other booth device or joins a formed mesh network comprising two or more other booth devices.

Depending upon the deployment location, with or without a manager database 514, booth devices 507a-507h are configured with a program to resolve the most effective path to communicate data in the mesh network, e.g., from the database manager 514 to various vendors, between vendors and attendees, and even out to a broader network connection.

As each booth device 507a-507h is deployed, a mesh of peers is established. The peer network configuration permits the booth devices 507a-507h, so long as they are in close enough proximity to communicate with each other, to form into a mesh network. If a device of 507a-507h fails in the field, it can simply be replaced with an additional device that is self-configuring and self-inserting into the mesh network.

Any of the booth devices 507a-507h can leverage a capacitive pattern or radio frequency method to recognize where it is located within the mesh network. Like techniques are also used to determine proximity and self-routing capabilities from peer-to-peer (or node to node). As illustrated in FIG. 5, the mesh network could be deployed within a single convention center tradeshow environment that extends out to an exterior environment such as a courtyard, a golf course, or other large outdoor venue. The mesh network formed by booth devices 507a-507h can also bridge large distances between multiple convention centers or buildings, or even be formed over many city blocks.

The mesh network formed by booth devices 507a-507h can not only provide location data at the same elevation, but also can provide location data at a variety of elevations, e.g., corresponding to hills on a golf course, floors in a building, or sections in a stadium or coliseum, or elevations in any venue, stationary or moving, that are proximate to each other.

Referring back to FIG. 1 and FIG. 2, as with the attendee 102, 202 described in connection with FIG. 1 and FIG. 2, the initial experience for a vendor is similar to a client configuration process. That is, the vendor can configure the experience. A vendor will, for example, identify the content available from the vendor to the clients and provide that to the manager database 214. The manager database 214 includes scheduling data for the event and identifies any live broadcasts (e.g., FM broadcast or other), a schedule of events, contact information, etc., as submitted by the vendors. The vendor's booth device, e.g., booth device 207, will be provided with a unique ID that is continuously broadcast throughout the event from a dedicated device given to the vendor. This unique ID identifies the vendor to incoming clients, e.g., client 102, 202, and to other vendors in proximity. The vendor's booth device, e.g., device 207, acts as a beacon or broadcasting device to advertise its presence to other devices within range. Each vendor's ID is unique and contributes to spatial relationship information between other vendors and to the manager database 214.

In FIG. 1 for example, as a client mobile device 103 passes a booth 105, a vendor can choose to pull in attendee information via the unique client ID available from the client mobile device 103. The vendor may not automatically pass information to a client mobile device 103, for example if the client 102 has not configured the application running on the client mobile device 103 to express an interest in the vendor, either ahead of time as part of a set up process or manually to request information in real time.

During the configuration process for a vendor, if a specific client, e.g., client 102, enters the location and passes near the booth 105, the vendor can be notified by the booth device 107. As the client mobile device 103 passes the booth 105, contact information can be obtained by exchange between devices 103, 107, as long as the client 102 has not blocked the vendor.

Demographic data from the event indicating performance pertinent to the vendor can be made available through the manager database 214 as data is exchanged specific to a vendor. In addition, key metrics such as stickiness (the amount of time a client spent in or around a booth), information about the client's industry or other relevant client information can be provided, e.g., as anonymized information. This data, e.g., reports and visualizations of the key metrics of interest, can be provided to the vendor or client in real time.

Given that the booth devices, e.g., devices 507a-507h can communicate and build up a logical spatial relationship based in their nearest neighboring booth devices, an embodiment can utilize this data to generate dynamic maps of the event space in terms of booth device location. Clients and vendors can leverage dynamic maps both indoors and outdoors. For example, geo-positioning and location can be provided through a combination of the deployed network and predetermined data (e.g., known data regarding the event space dimensions), leveraging technologies such as SIM, Wi-Fi®, GPS, IR, Bluetooth® LE, etc. Dynamic mapping allows clients to find vendor booths and vendors to know when a client of interest is in proximity to the vendor's booth.

The network of booth devices 507a-507h facilitates use of and changing between one communication technology and another. For example, geo-positioning location data is passed through the client mobile device to any of booth devices 507a-507h in order to offer additional data regarding the locations of booth devices 507a-507h. Combining this with integrated device functionality, such as GPS and deployed network functionality, content can be tied to a location ID and provided to both vendors and clients through the manager database 514.

An embodiment also improves a large bottleneck for event coordination, i.e., how to manage the confirmation process at the front doors or check points of an event. Many times event badges are issued to clients and participants. Typically worn on a lanyard, these must be individually inspected to assure that the client or participant is allowed to enter. An embodiment provides alternative methods using electronic devices, e.g., client mobile device 103, carried by the clients and participants.

As an example, clients with proper credentials may have a combination of a unique color and/or code presented on their device that allows staff to easily see if a person should be allowed to enter or not. Additional methods include that any color onscreen, e.g., except black, are allowed to enter. Additional security could include a symbol, shape, or alphanumeric code. Attendees simply hold up their devices for easy visibility by staff.

In an alternative embodiment, a device carried by staff authenticates those authorized to enter the event using a display on the staff device. The display is generated by communicating with a client's device or lanyard equipped with an identifying beacon or other signal. This automates the process and eliminates the need for a client to hold up a device, a lanyard, a badge, etc., and significantly reduces throughput wait time during credential validation.

Various aspects may be embodied as a system, method or device program product. Accordingly, aspects may take the form of an entirely hardware embodiment or an embodiment including software that may all generally be referred to herein as a "module" or "system." Furthermore, aspects may take the form of a device program product embodied in one or more device readable medium(s) having device readable program code embodied therewith.

The various functions described herein may be implemented using instructions stored on a device readable storage medium such as a non-signal storage device that are executed by a processor. A storage device may be, for example, an electronic device such as a random access memory (RAM), a read-only memory (ROM), an erasable programmable read-only memory (EPROM or Flash memory), or any suitable device. In the context of this document, a storage device is not a signal and "non-transitory" includes all media except signal media.

Example embodiments are described herein with reference to the figures, which illustrate example methods, devices and program products. The actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

What is claimed is:

1. A system for event space communication infrastructure, comprising:
   a plurality of mobile infrastructure devices;
   each of the plurality of mobile infrastructure devices being associated with one or more predetermined users within a venue;
   each of the plurality of mobile infrastructure devices comprising a wireless communication device that:
      broadcasts a unique identifier associated with a specific one of the one or more predetermined users within the venue;
      detects a response from at least one client mobile device, wherein the at least one client mobile device runs an application associated with the venue and wherein a user of the corresponding at least one mobile device has identified interest in receiving information from the specific one of the one or more predetermined users via use of the application prior to an event at the venue, and wherein the response is generated by the at least one client mobile device responsive to determining presence of the unique identifier in a received signal;
switches from a broadcast mode into a two-way communication mode after detecting the response; and
establishes data exchange with the at least one client mobile device including communicating, or providing access to, the information.

2. The system of claim 1, further comprising:
a server communicating with the plurality of mobile infrastructure devices and the at least one client mobile device, the server comprising:
data associating the one or more predetermined users with the plurality of mobile infrastructure devices; and
data associating one or more registered users with the at least one client mobile device.

3. The system of claim 2, wherein each of the plurality of mobile infrastructure devices detects one or more neighboring mobile infrastructure devices and transmits identification data to the server.

4. The system of claim 3, wherein the server resolves relative locations of the plurality of mobile infrastructure devices using the identification data.

5. The system of claim 4, wherein the server provides map data comprising the identification data.

6. The system of claim 2, wherein the server provides reporting data regarding the at least one client mobile device detected by at least one of the plurality of mobile infrastructure devices.

7. The system of claim 6, wherein the reporting data comprises real-time location data regarding the at least one client mobile device.

8. The system of claim 6, wherein the reporting data comprises aggregated data for a period of time regarding the at least one client mobile device.

9. The system of claim 2, wherein the server accesses configuration data provided by a client mobile device indicating authorization for automated communication from one of the plurality of mobile infrastructure devices.

10. The system of claim 9, wherein the one of the plurality of mobile infrastructure devices automatically transmits data to the client mobile device that has authorized automated communication in response to detecting the client mobile device is in proximity to the one of the plurality of mobile infrastructure devices.

11. The system of claim 1, wherein the data exchange further includes communication of information corresponding to the user including contact information for the user from the at least one mobile client device directly to the mobile infrastructure device or indirectly via a database manager and wherein, during the data exchange, data is sent to the database manager for at least one of demographic heuristics, metrics, and real-time analytics.

12. A method for event space communication, comprising:
broadcasting, with a mobile infrastructure device, a unique identifier associated with a predetermined user among a plurality of potential users within a venue;
detecting, at the mobile infrastructure device, a response from at least one client mobile device, wherein the at least one client mobile device comprises an application associated with the venue and providing a listing of the plurality of potential users and wherein a user of the corresponding at least one mobile device has identified interest in the predetermined user via use of the application prior to an event at the venue, and wherein the response is generated from the at least one client mobile device responsive to receipt and processing of a signal including the unique identifier;
switching the mobile infrastructure device from a broadcast mode into a communication mode after detecting the response; and
establishing, between the mobile infrastructure device and the at least one client mobile device, data exchange including transfer of, or providing access to, information identified by the user via the application to the at least one client mobile device and further including providing unique identifying information for the user of the at least one mobile device to the predetermined user of the mobile infrastructure device.

13. The method of claim 12, further comprising reporting, from the mobile infrastructure device to a server communicating with the mobile infrastructure device, that the at least one client mobile device has been detected.

14. The method of claim 13, further comprising:
detecting, with the mobile infrastructure device, one or more neighboring mobile infrastructure devices; and
resolving relative locations of the mobile infrastructure device and the one or more neighboring mobile infrastructure devices.

15. A method for event space communication, comprising:
providing, to a client mobile device, an application comprising predetermined user information associated with vendors within a venue;
receiving, from the client mobile device via the application, an indication of interest in a predetermined user from a plurality of predetermined users included in the predetermined user information prior to an event at the venue;
identifying, using a processor, the predetermined user based on the indication of interest, wherein the identifying is responsive to determining the client mobile device is within proximity of the predetermined user within the venue based upon receiving a unique identifier of the predetermined user and matching the unique identifier to the predetermined user identified from the client mobile device;
providing, to the client mobile device, a signal with the unique identifier of the predetermined user;
thereafter communicating, to a mobile infrastructure device assigned to the predetermined user, a unique identifier of a user of the client mobile device; and
establishing a two-way data exchange between the user of the client mobile device and the predetermined user of the mobile infrastructure device.

16. The method of claim 15, further comprising:
transmitting, to a device associated with the unique identifier of the predetermined user, data, wherein the data is selected from the group consisting of: a number of client mobile devices providing indications of interest; and a number of client mobile devices detected by the mobile infrastructure device assigned to the predetermined user.

17. The method of claim 16, wherein the transmitting proceeds according to a predetermined timing policy.

18. A mobile infrastructure device for event space communication, comprising:

a communication device that broadcasts a unique identifier associated with a predetermined user within a venue; and a processor that detects a response from at least one client mobile device and switches from a broadcast mode into a communication mode after detecting the response wherein the at least one client mobile device comprises an application associated with the venue and wherein a user of the corresponding at least one mobile device has identified interest in at least one of the one or more predetermined users via use of the application prior to an event at the venue, and wherein the response is generated from the at least one client mobile device responsive to the unique identifier matching the at least one of the one or more predetermined users, wherein the communication device, after detecting the response from the at least one client device, establishes data exchange with the at least one client mobile device, wherein the processor: detects one or more other mobile infrastructure devices in communication range with the communication device and, in response, forms or joins a mesh network comprising the mobile infrastructure device and the detected one or more other mobile infrastructure devices, and wherein the mesh network is used by mobile infrastructure device to communicate with a server providing a manager database through a communication path including a subset of the detected one or more other mobile infrastructure devices.

19. The mobile infrastructure device of claim 18, wherein the data exchange is encrypted using a code unique to a communication session between the mobile infrastructure device and the at least one client device.

20. The mobile infrastructure device of claim 18, wherein the data exchange comprises data selected from the group consisting of contact data, audio data, and video data.

* * * * *